(12) United States Patent
Dolcetta et al.

(10) Patent No.: US 7,656,284 B2
(45) Date of Patent: Feb. 2, 2010

(54) MULTIPURPOSE OPTICAL SIGNALLING DEVICE, PARTICULARLY FOR ROAD EMERGENCY IN LOW VISIBILITY CONDITIONS

(75) Inventors: Alessandro Dolcetta, Vicenza (IT); Alberto Filosofo, Vicenza (IT)

(73) Assignee: Astron Fiamm Safety S.p.A., Montecchio Maggiore (IT)

( * ) Notice: Subject to any disclaimer, the term of this patent is extended or adjusted under 35 U.S.C. 154(b) by 305 days.

(21) Appl. No.: 11/569,966

(22) PCT Filed: Jun. 6, 2005

(86) PCT No.: PCT/IB2005/001589

§ 371 (c)(1), (2), (4) Date: Dec. 20, 2006

(87) PCT Pub. No.: WO2005/118340

PCT Pub. Date: Dec. 15, 2005

(65) Prior Publication Data

US 2007/0229246 A1    Oct. 4, 2007

(30) Foreign Application Priority Data

Jun. 4, 2004 (IT) .......................... VI2004A0138

(51) Int. Cl.
B60Q 7/00 (2006.01)
(52) U.S. Cl. .................. 340/473; 340/474; 340/331; 340/332; 362/157; 362/362; 362/500

(58) Field of Classification Search ................. 340/473, 340/474, 321, 332, 331; 362/157, 362, 500
See application file for complete search history.

(56) References Cited

U.S. PATENT DOCUMENTS

| | | | |
|---|---|---|---|
| 4,440,104 A | 4/1984 | Bleiweiss | |
| 4,875,028 A | 10/1989 | Chou | |
| 5,512,876 A | 4/1996 | Brusca | |
| 5,923,243 A | 7/1999 | Bleiner et al. | |
| 6,275,149 B1 * | 8/2001 | Tung | 340/473 |
| 6,515,584 B2 | 2/2003 | DeYoung | |
| 6,707,391 B1 * | 3/2004 | Monroe | 340/901 |
| 6,756,581 B2 * | 6/2004 | Ohtomo et al. | 250/231.13 |

(Continued)

FOREIGN PATENT DOCUMENTS

DE    4012120    10/1991

(Continued)

*Primary Examiner*—Tai T Nguyen
(74) *Attorney, Agent, or Firm*—Themis Law

(57) ABSTRACT

A multi-purpose visual signaling device, particularly for road emergency warning and in low visibility conditions, includes light-emitting means for generating a light beam and means for supplying power to the light-emitting means. The light-emitting means include at least one laser projector adapted to project images over a substantially flat surface for such images to be visible from a relatively long distance. The light-emitting means and the power supply means are mounted onto a stationary support structure, which may include a front warning triangle-defining portion. The laser projector comprises at least one laser diode and optical and/or electronic means for generating images in space or over a substantially flat surface. The optical and/or electronic means comprise a diffractive lens. Images include monochromatic, polychromatic and/or holographic images, possibly of variable configuration, and preferably form a triangular design.

16 Claims, 2 Drawing Sheets

U.S. PATENT DOCUMENTS

| | | | |
|---|---|---|---|
| 7,128,420 B2 * | 10/2006 | Kapellner et al. | 353/38 |
| 7,158,020 B2 * | 1/2007 | Grady, Jr. | 340/473 |
| 2006/0291020 A1 * | 12/2006 | Knox et al. | 359/15 |
| 2008/0048979 A1 * | 2/2008 | Ruttenberg | 345/158 |

FOREIGN PATENT DOCUMENTS

| | | |
|---|---|---|
| DE | 4018327 | 12/1991 |
| DE | 20008358 | 5/2001 |
| DE | 10134594 | 1/2003 |
| EP | 0691243 | 1/1996 |
| FR | 2816264 | 5/2002 |

* cited by examiner

MULTIPURPOSE OPTICAL SIGNALLING DEVICE, PARTICULARLY FOR ROAD EMERGENCY IN LOW VISIBILITY CONDITIONS

FIELD OF THE INVENTION

The present invention finds application in the field of road safety and relates to a multi-purpose visual signaling device.

More particularly, the present invention relates to a visual signaling device for road emergency warning, which may be carried aboard a car or similar vehicle and may be used to signal the presence of the vehicle or the person carried therein to prevent accidents, especially in low visibility conditions.

BACKGROUND ART

Fixed obstacles on the road, such as tollgates, roadwork sites, accidented vehicles, and road maintenance workers, are equipped with various devices designed to make them easily visible, especially in the dark or in particular environmental conditions, such as fog, snow or rain.

Currently available equipment essentially consists of active or passive visual devices, such as signaling lights, reflex reflectors, and warning triangles.

In conditions of particularly low visibility, this equipment may be inadequate, exposing the road user to serious risks of accidents.

U.S. Pat. No. 4,440,104 discloses and claims a warning triangle device, having retroreflective and fluorescent arms, which increase visibility thereof when lit up.

This prior art arrangement has the drawback that the effectiveness of the retroreflective material is dependent on the intensity of the light source that lights it up. In the event of low visibility, such as in fog conditions, the light source, e.g. the headlights of an approaching vehicle is partly attenuated, and so is the reflected signal. The light beam passes through the light-emitting means twice, i.e. from the approaching vehicle to the reflective material and from the reflective material to the observer.

A further drawback of this device is that, in low visibility conditions caused by fog, if the approaching vehicle uses upper beams, the light reflected by the fog causes an excessive diffused lighting, which may dazzle the driver. However, if the driver properly uses fog-guards, which are normally downwardly and sideways directed, the warning triangle is seen at the last moment.

U.S. Pat. No. 4,875,028 discloses a safety triangle which has, in addition to a retroreflective surface, an inner portion with red or yellow light sources. This device uses the power of the car battery, through a DC connector to be connected to the cigarette-lighter socket.

In addition to the disadvantages as set out above, such prior art device has the drawback that it has to be placed on the vehicle, e.g. on the roof, due to the power supply arrangement, to provide a signal that is eventually untimely, especially in low visibility conditions.

An additional shortcoming of this triangle is that, in case of prolonged usage, it may discharge the car battery, thereby causing serious damages thereto.

From U.S. Pat. No. 6,515,584 a safety device is known, onto which blinking lights are mounted that produce a rapid pattern of short light pulses, followed by a more or less long pause.

This prior art arrangement has the drawback of dazzling the driver, the light source having a very high intensity. Furthermore, it has a very complex light control arrangement, which requires a high battery power absorption, whereby batteries tend to discharge rapidly, which makes the device unusable in case of prolonged usage.

Other emergency warning devices are known from U.S. Pat. No. 5,512,876, EP 089852, and EP 0691243.

These devices are also of little use, especially in low visibility conditions, as they generate a very low-intensity light beam.

Generally, all the above prior art arrangements have the drawback that, to provide an effective emergency warning signal, the user has to place the device at a very short distance from the stopped or disabled vehicle, as prescribed by applicable rules, and is thereby exposed to danger.

French patent 2,816,264 discloses a visual signaling device mounted onto a vehicle, which is based on the use of laser beam projection, providing effective visibility properties in low visibility conditions.

However, no attempt has been made heretofore to include a laser light source on a fixed signaling device like a warning triangle.

SUMMARY OF THE INVENTION

An object of this invention is to overcome the above drawbacks, while providing a multi-purpose emergency warning device that is practical, cost-effective and most of all efficient.

Another object is to provide a signaling device that is visible in poor light conditions, such as at night or by rain, fog, snow or hail conditions.

A further object is to provide a signal that is visible from a long distances, to enable oncoming drivers to perceive the danger well before reaching the position where the signal has been placed.

One more object is to provide a device that can orient a light beam toward oncoming vehicles, even in extreme conditions, such as in curves.

Another object is to provide a signal that requires a low power supply, while providing good visibility of the light source, so that no problems occur in case of prolonged usage.

Furthermore, a particular object of this invention is to provide a signal that, although used very near a stopped vehicle, is capable of identifying the position of the vehicle from a suitable distance to prevent the user from dangerously moving beyond the edge of the road.

Another object is to provide a signal that the user may orient toward the approaching traffic, regardless of the position of the stopped vehicle and the configuration of the road.

Finally, an object of the invention is to provide an apparatus that may be used in any condition.

These objects, as well as other objects that will be more apparent hereafter, are achieved by a multipurpose visual signaling device, particularly for road use and in low visibility conditions, which comprises light-emitting means for generating a light beam and means for supplying power to said light-emitting means, characterized in that these light-emitting means comprise at least one laser projector adapted to project images visible from a relatively long distance, such as the design of a warning triangle.

Preferably, the laser projector comprises at least one laser diode and optical and/or electronic means for generating images in space or over a substantially flat surface.

The light-emitting means and the power supply means may be mounted onto a stationary support structure, which may stand on the ground or be attached to a car or another stationary structure.

Advantageously, the support structure may include a base, with a multilateral, box-like housing having a substantially U-shaped cross-section, adapted to receive the power supply means and the laser projector.

The support structure may have a front portion that defines a warning triangle, to be attached to a base. By this particular arrangement, the apparatus of the present invention signals the danger deriving from an obstacle on the roadway in a simple, safe and timely manner, particularly in low visibility conditions.

BRIEF DESCRIPTION OF THE DRAWINGS

Further characteristics and advantages of the invention will be more apparent from the detailed description of one preferred but non-exclusive embodiment of an apparatus according to the invention, which is described as a non-limiting example with the help of the annexed drawings, in which.

DETAILED DESCRIPTION OF A PREFERRED EMBODIMENT

Figure 1:
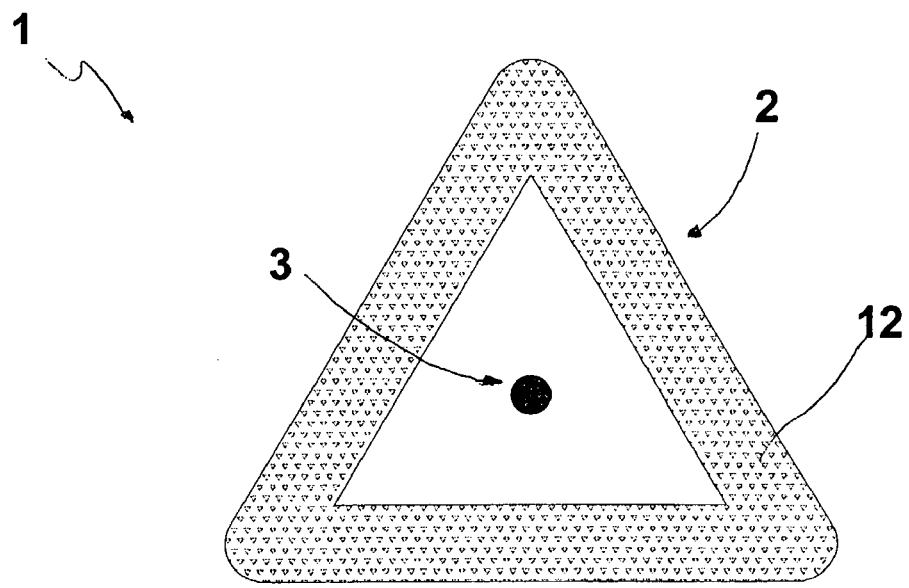
FIG. 1 is a front view of the apparatus constructed according to an embodiment of the present invention.
Figure 2:
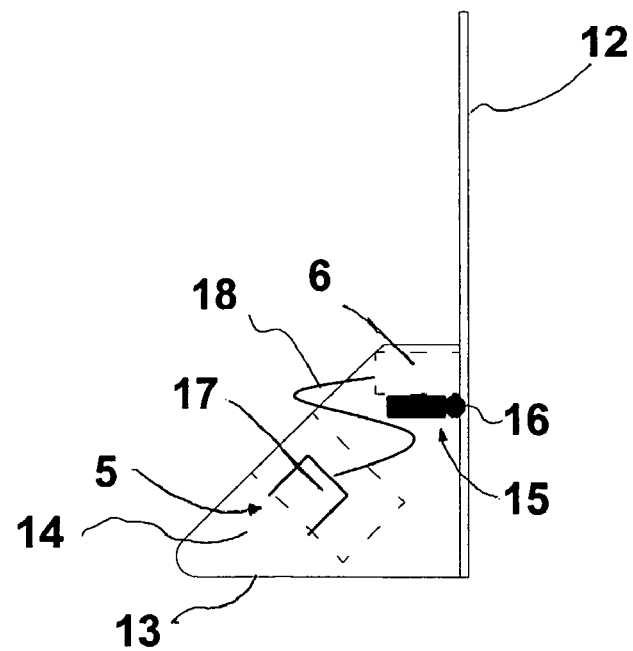
FIG. 2 is a side view of a detail of the apparatus of FIG. 1.
Figure 3:
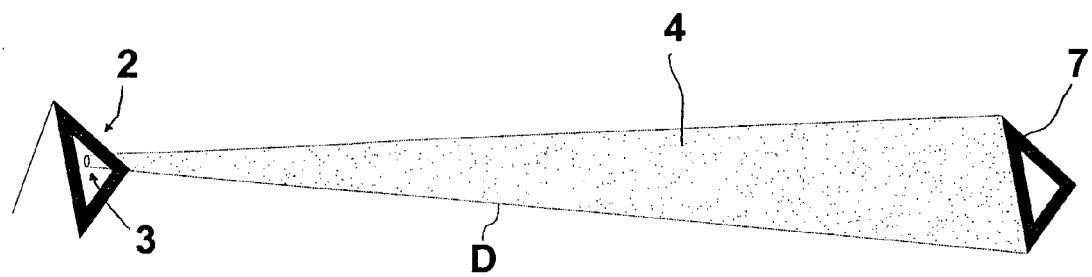
FIG. 3 is a side view of a detail of the apparatus of FIG. 1 in operating conditions.
Figure 4:
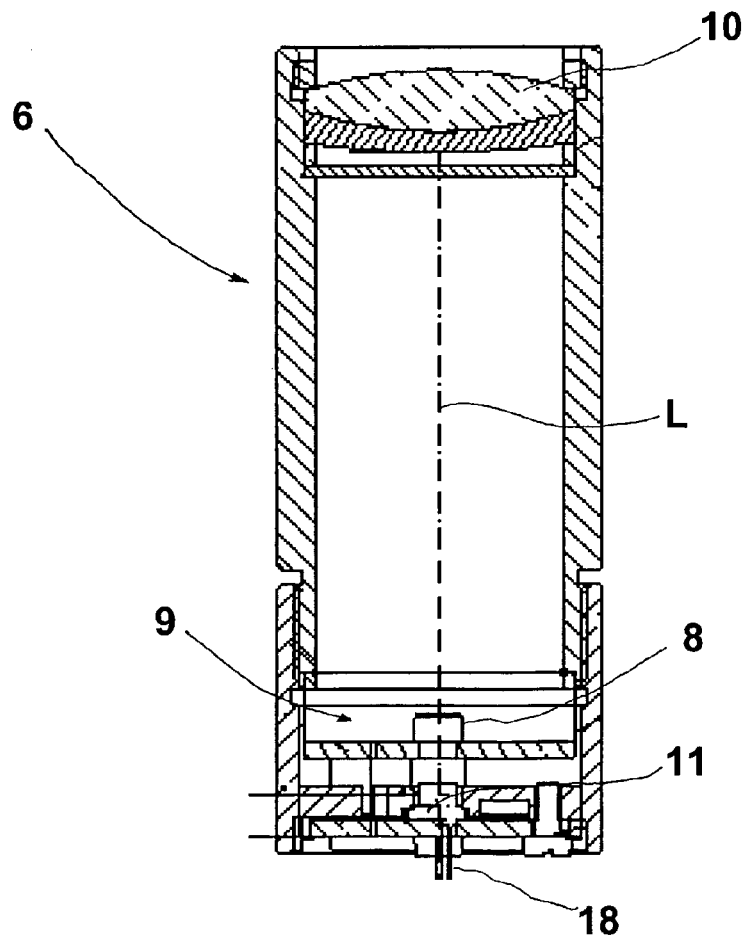
FIG. 4 is a sectional view of a detail of the apparatus of FIG. 1.

Referring to the above mentioned figures, the multipurpose visual device according to an embodiment of the present invention, particularly intended for road use in low visibility conditions, is denoted by numeral 1.

The device 1 comprises a support structure 2, which may stand on the ground, with light-emitting means 3 for generating a light beam 4, and means 5 for supplying power to the light-emitting means 3 being removably mounted thereto.

Particularly, such means include at least one laser projector 6 adapted to project images 7 over a substantially flat surface for such images to be visible from a relatively long distance.

The laser projector 6 may include a laser diode 8.

The laser projector 6 may further comprise optical and/or electronic means 9 for generating one or more images 7 in space or over a substantially flat surface, such as the roadway.

The optical and/or electronic means 9 may be selected among: lenses, prisms, mirrors, LCD electron mirrors, and micromirrors.

Advantageously, the optical and/or electronic means 9 may comprise at least one diffractive lens 10. Particularly, the diffractive lens 10 may be at a distance L of 10 mm to 100 mm, preferably of about 45 mm, from the laser diode 8.

Also, the optical and/or electronic means 9 may comprise an electronic card 11 between the power supply means 5 and the laser diode 8.

The images 7 provided by the laser projector 6 and the optical and/or electronic means 9 may include monochromatic, polychromatic and/or holographic images, which may be stationary or have a variable configuration. They may also include alphanumeric characters.

In a preferred embodiment, shown in the figures, the image 7 may form a triangular design, to reproduce the triangular danger signal at a certain distance from the light source.

The support structure 2 may have a front portion 12 that defines a warning triangle, to be attached to a base 13.

Particularly, the latter may include a multilateral, box-like housing 14, having a substantially U-shaped cross-section, adapted to receive the power supply means 5 and the laser projector 6.

Advantageously, the multilateral housing 14 may have a rear portion adapted to be held by a user, to allow use as a portable signal.

Possibly, the multilateral housing 14 may be equipped with suitable attachment means, such as permanent magnets or clamps, not shown, for attachment to the roof or body of a car or other stationary structures.

For images 7 to be projected toward the oncoming traffic at a predetermined distance D from the base 13, the laser projector 3 is attached to the support structure 2 by adjustable tilt means 15. The latter also prevent the beam 4 from dazzling the drivers of oncoming vehicles.

Particularly, the distance D may be 10 m to 250 m, and is preferably approximately 150 m.

The adjustable tilt means 15 may include a knuckle joint 16 that may be selectively locked in a plurality of angular positions.

The power supply means 5 may comprise at least one battery 17 connected to said laser projector 6 by means of electrical conductors 18.

The above disclosure shows that the inventive device fulfils the above objects, and namely provides well visible emergency warning signals, particularly under low visibility conditions, at relatively long distances from the position in which the device is placed.

Thanks to the use of the laser projector 6 to project a light beam 4 from a certain distance, timely, effective, safe and long-lasting signals may be provided.

The device of this invention is susceptible to a number of changes and variants, within the inventive concept disclosed in the appended claims.

All the details herein may be replaced by other technically equivalent parts, and the materials may vary depending on different needs, without departure from the scope of the invention.

While the device has been described with particular reference to the accompanying figures, the numerals referred to in the disclosure and claims are only used for a better intelligibility of the invention and shall not be intended to limit the scope of the claims in any manner.

What is claimed is:

1. A multi-purpose signaling device for road emergency warning in low visibility conditions, the device comprising:
   a support structure having a base and a rear portion, the support structure being configured to be positioned on a ground, secured to a car or to a stationary structure, or to be held by a user;
   light emitting means for generating a light beam;
   power supply means for supplying said light-emitting means, said light emitting means and said power supply means being both mounted onto said support structure;
   wherein said light emitting means include a laser projector comprising one or more of optical or electronic means for projecting one or more images in an open space or over a substantially flat surface,
   wherein said laser projector is configured to be oriented toward the ground and to project said one or more images thereon at a predetermined distance from said base, and
   wherein said one or more images comprise a visible warning signal image.

2. The device as claimed in claim 1, wherein said laser projector comprises at least one laser diode.

3. The device as claimed in claim 2, wherein said one or more of optical or electronic means comprise an electronic card interposed between said power supply means and said at least one laser diode.

4. The device as claimed in claim 1, wherein said one or more of optical or electronic means are selected from the group consisting of lenses, prisms, mirrors, LCD electron mirrors, and micromirrors.

5. The device as claimed in claim 1, wherein said one or more of optical or electronic means comprise at least one diffractive lens.

6. The device as claimed in claim 5, wherein said diffractive lens is spaced from said laser diode by a distance of 10 mm to 100 mm.

7. The device as claimed in claim 1, wherein said one or more images include one or more of monochromatic, polychromatic or holographic images.

8. The device as claimed in claim 1, wherein said warning signal image comprises a triangular design.

9. The device as claimed in claim 1, wherein said one or more images comprise alphanumeric characters.

10. The device as claimed in claim 1, wherein said support structure includes a base having a multilateral housing, said housing having a substantially U-shaped cross-section configured to receive said power supply means and said laser projector.

11. The device as claimed in claim 10, wherein said support structure has a front portion that defines a warning triangle to be attached to said base.

12. The device as claimed in claim 1, wherein said laser projector is secured to said support structure by adjustable tilting means, causing a projection of said one or more images parallel to a roadway at a predetermined distance therefrom, so to prevent the light beam from directly encroaching eyesights of drivers of oncoming vehicles.

13. The device as claimed in claim 12, wherein said predetermined distance is 10 m to 250 m.

14. The device as claimed in claim 12, wherein said adjustable tilting means include an articulated joint selectively lockable in a plurality of angular positions.

15. The device as claimed in claim 1, wherein said power supply means comprise at least one battery connected to said laser projector with electrical leads.

16. The device of claim 1, wherein said one or more of optical or electronic means project said one or more images of a variable configuration.

\* \* \* \* \*